E. A. THRUSH.
Corn Planter.

No. 100,215.  Patented Feb. 22, 1870.

Witnesses:
L. Hailer
P. T. Dodge

Inventor:
E A Thrush
by Dodge & Munn
his attys

United States Patent Office.

E. A. THRUSH, OF NEW KINGSTON, PENNSYLVANIA.

Letters Patent No. 100,215, dated February 22, 1870; antedated February 14, 1870.

IMPROVEMENT IN CORN-PLANTERS.

The Schedule referred to in these Letters Patent and making part of the same.

*To all whom it may concern:*

Be it known that I, E. A. THRUSH, of New Kingston, in the county of Cumb rland, and State of Pennsylvania, have invented certain new and useful Improvements in Corn-Planters; and I do hereby declare that the following is a full, clear, and exact description thereof, reference being had to the accompanying drawings making part of this specification and to the letters of reference marked thereon, like letters indicating like parts wherever they occur.

To enable others skilled in the art to construct and use my invention, I will proceed to describe it.

My invention relates to corn-planters, and consists in the novel construction and arrangement of the frame of the machine, with its working parts so that the operator may see that the seed are dropped into the furrow before it is closed.

In the drawings—

In most seed-sowers, as heretofore constructed, the devices for covering the seed follow so close after the seed are dropped, it is impossible for the operator to note any failures of the machine to drop the seed required. The object of my invention is to enable the operator to see whether the seed have been dropped or not before the furrow is covered, so that he may supply the want, if any, at the time of planting. To accomplish this, I make a rectangular frame, A, of any size desired, with two longitudinal pieces, g, extending from its front to its rear end, and parallel with each other, and so arranged as to be equally distant from a line running through the center of the frame.

Figure 1:
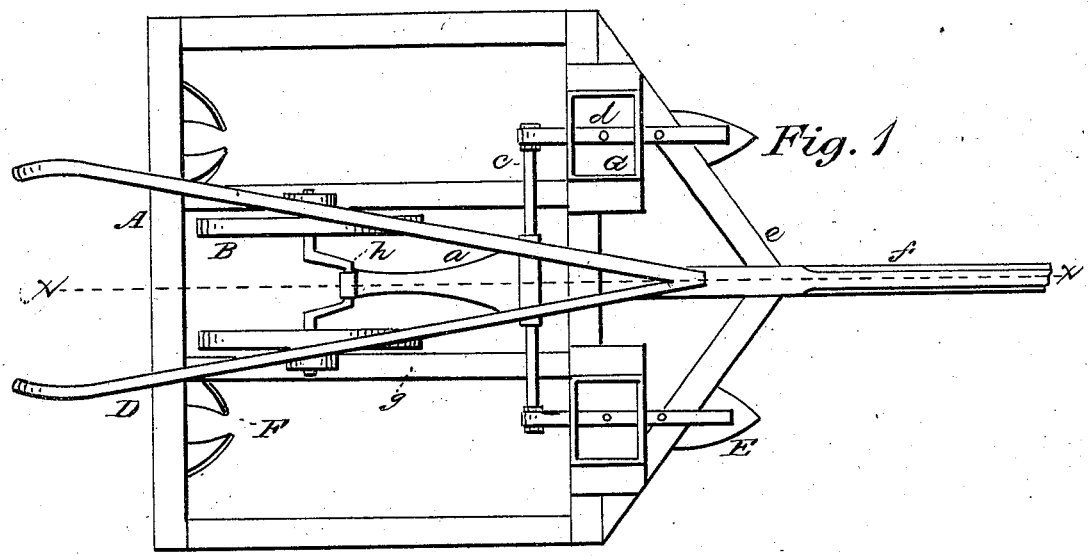
Figure 1 is a top plan view.

To the front end of the frame I attach rigidly the tongue f, and stiffen it with the braces e, which also form a part of the frame, all as clearly shown in fig. 1.

This frame A I mount on wheels, B, rigidly attached to a double-crank axle, h, which has its bearings in the cross-pieces g, and is so arranged that the wheels turn between these pieces g, as clearly shown in the same figure.

Figure 2:
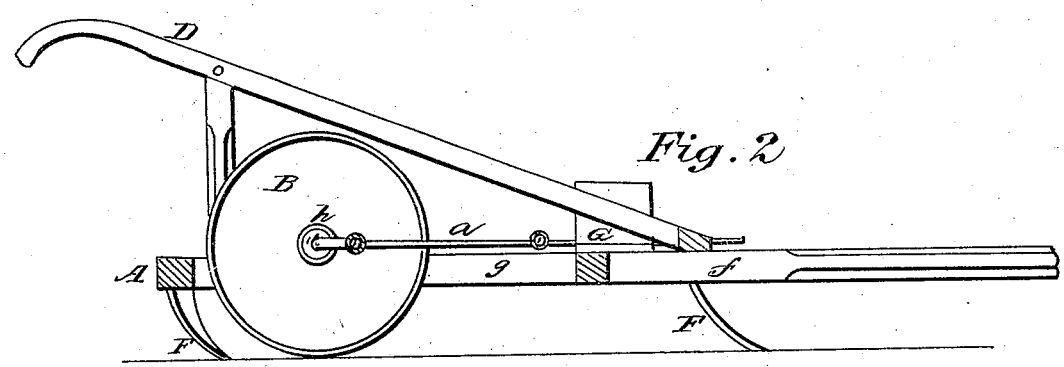
Figure 2 is a longitudinal vertical section on the line x x of fig. 1.

On the front cross-piece of the frame I mount two hoppers, G, equally distant from its center. In these hoppers I place slides, d, in the usual manner, and constructed and arranged to operate in any of the approved ways. Their rear ends I pivot to a shaft or cross-rod, c, which I connect with the double-crank axle h by a pitman, a, as shown in figs. 1 and 2.

Under the braces e, and so as to be in line with the hoppers G, I attach cultivator shovel-teeth, E, for opening the furrows, and to the under side of the cross-piece forming the rear end of the frame I attach metallic blades, F, so as to be in a direct line with the shovels and hoppers, and curved so as to cover the seed in the furrows, as clearly shown in both figures. To the upper side of the frame I attach the handles D in the usual manner.

In operating my machine, it will be seen that as it moves forward, the wheels B, through their crank-axle h and pitman a, give a reciprocating motion to the slides d, and that the seed may be dropped from the hoppers by any of the usual devices; that as the covering-blades F are some little distance in the rear of the point at which the seed should be dropped, the operator can note at once whether the seed is dropped or not, and supply the deficiency at the time or afterwards, as he may desire.

It is obvious that the hoppers G, shovels E, and covering-blades F may all be arranged so as to be adjustable, in order to plant the hills or rows at such distance as may be preferred.

In this way I am able to produce a simple, cheap, and convenient planter, so arranged that the operator can always know when and where it has failed to drop the seed desired.

Having thus described my invention,

What I claim is—

A corn-planter consisting of the frame A, having the shovels E and F and hoppers G, arranged as shown, and provided with the wheels B, double-crank axle h, pitman a, and cross-rod c for operating the seed-slides, in the manner herein set forth.

E. A. THRUSH.

Witnesses:
H. B. MUNN,
L. HAILER.